(12) United States Patent
Gradle

(10) Patent No.: US 10,100,936 B2
(45) Date of Patent: Oct. 16, 2018

(54) PARALLEL SLIDE GATE VALVES AND RELATED METHODS

(71) Applicant: Flowserve Management Company, Irving, TX (US)

(72) Inventor: Richard J. Gradle, Garner, NC (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 14/696,321

(22) Filed: Apr. 24, 2015

(65) Prior Publication Data

US 2016/0312905 A1  Oct. 27, 2016

(51) Int. Cl.
*F16K 3/18* (2006.01)
*F16K 25/00* (2006.01)
*F16K 3/316* (2006.01)
*F16K 27/04* (2006.01)
*F16K 3/02* (2006.01)

(52) U.S. Cl.
CPC ............ *F16K 3/18* (2013.01); *F16K 3/0281* (2013.01); *F16K 3/316* (2013.01); *F16K 25/005* (2013.01); *F16K 27/044* (2013.01)

(58) Field of Classification Search
CPC ... F16K 3/16; F16K 3/18; F16K 3/184; F16K 3/0281; F16K 3/029; F16K 3/316
USPC ....... 251/195, 193, 170, 167, 176, 174, 327, 251/203–204, 328–329
See application file for complete search history.

(56) References Cited

U.S. PATENT DOCUMENTS

| 85,263 | A | * | 12/1868 | Ludlorr | ................... F16K 3/184 251/199 |
| 565,239 | A | * | 8/1896 | Sheets | ..................... F16K 3/186 251/195 |
| 623,194 | A | * | 4/1899 | Vollmann | .............. F16K 3/0281 137/242 |

(Continued)

FOREIGN PATENT DOCUMENTS

DE  282241  * 6/1913
DE  282241 C  2/1915

(Continued)

OTHER PUBLICATIONS

International Search Report and Written Opinion for International application No. PCT/US2016/028658 dated Jul. 29, 2016, 16 pages.

(Continued)

*Primary Examiner* — Reinaldo Sanchez-Medina
*Assistant Examiner* — David Colon Morales
(74) *Attorney, Agent, or Firm* — Magleby, Cataxinos & Greenwood, P.C.

(57) ABSTRACT

A parallel slide gate valve includes a valve body comprising an interior surface, and an obturator therein. A portion of the interior surface defines a groove having a longitudinal axis oriented substantially perpendicular to a direction of flow through the valve body. The groove has a first width at a first end proximate to the fluid flow path and a second width at a second end distal from the fluid flow path, the second width smaller than the first width. The obturator is at least partially within the at least one groove. The obturator is configured to translate from the first end of the at least one groove toward the second end of the at least one groove as the obturator moves from a closed position to an open position.

15 Claims, 3 Drawing Sheets

(56) References Cited

U.S. PATENT DOCUMENTS

| | | | |
|---|---|---|---|
| 650,989 A * | 6/1900 | Ranoe | F16K 3/184 251/198 |
| 697,598 A * | 4/1902 | Baker | F16K 3/186 251/152 |
| 751,735 A * | 2/1904 | Jacobsen | F16K 3/186 251/195 |
| 959,728 A * | 5/1910 | Fletcher | F16K 3/184 251/199 |
| 1,391,987 A * | 9/1921 | Whaley | F16K 3/18 251/187 |
| 1,552,614 A * | 9/1925 | Kiley | F16K 3/12 251/327 |
| 1,647,734 A | 11/1927 | Kelly | |
| 1,844,246 A | 12/1929 | Fox | |
| 1,783,329 A * | 12/1930 | Edmonds | F16K 3/16 251/176 |
| 1,786,295 A * | 12/1930 | Ericsson | F16K 3/314 251/266 |
| 1,836,374 A * | 12/1931 | Kelly | F16K 3/184 137/242 |
| 1,863,650 A * | 6/1932 | Bolton | F16K 3/0272 251/176 |
| 2,075,123 A * | 3/1937 | Lunken | F16K 3/314 251/327 |
| 2,204,142 A * | 6/1940 | MacClatchie | F16K 3/316 251/169 |
| 2,230,600 A * | 2/1941 | Olson | F16K 3/36 137/246 |
| 2,293,016 A * | 8/1942 | Dopp | F16K 3/316 251/329 |
| 2,306,490 A * | 12/1942 | Noble | F16K 3/186 251/176 |
| 2,502,689 A * | 4/1950 | Yant | F16K 3/186 251/167 |
| 2,810,542 A * | 10/1957 | Bryant | F16K 3/0227 251/172 |
| 2,895,709 A * | 7/1959 | Rattigan | F16K 3/184 251/167 |
| 3,027,135 A * | 3/1962 | Kellar | F16K 3/184 251/199 |
| 3,038,692 A * | 6/1962 | Holmes | F16K 3/14 251/167 |
| 3,078,871 A * | 2/1963 | Magos | F16K 3/316 137/546 |
| 3,086,745 A | 4/1963 | Natho | |
| 3,123,090 A * | 3/1964 | Bredtschneider | F16K 39/04 137/112 |
| 3,282,559 A * | 11/1966 | Bredtschneider | F16K 3/316 251/327 |
| 3,348,567 A * | 10/1967 | Volpin | F16K 3/36 137/246.11 |
| 3,367,625 A | 2/1968 | Fortune | |
| 3,400,441 A * | 9/1968 | Fryling | F16K 3/14 251/195 |
| 3,478,771 A * | 11/1969 | Johnson | F16K 3/02 137/242 |
| 3,559,949 A | 2/1971 | Muller | |
| 3,689,028 A | 9/1972 | Dickensen et al. | |
| 3,837,617 A * | 9/1974 | Eminger | F16K 3/316 251/327 |
| 3,854,697 A * | 12/1974 | Salloga | F16K 3/184 251/167 |
| 3,993,285 A | 11/1976 | Conley | |
| 4,044,997 A | 8/1977 | Schelat | |
| 4,098,489 A | 7/1978 | Anders et al. | |
| 4,367,766 A * | 1/1983 | Uomala | F16K 3/12 137/243 |
| 4,522,230 A | 6/1985 | Clapper et al. | |
| 4,566,671 A | 1/1986 | Beson | |
| 4,706,934 A * | 11/1987 | Brown | F16K 3/184 251/167 |
| 5,158,264 A | 10/1992 | Le et al. | |
| 5,342,028 A | 8/1994 | Nevrekar | |
| 5,370,363 A * | 12/1994 | Klimpke | F16K 3/0272 251/329 |
| 5,549,278 A | 8/1996 | Sidler | |
| 5,704,594 A | 1/1998 | Wurangian | |
| 5,836,569 A * | 11/1998 | Wurangian | F16K 3/316 251/326 |
| 5,937,692 A * | 8/1999 | Weyand | B21C 23/20 72/356 |
| 6,164,324 A | 12/2000 | Gradle | |
| 6,338,469 B1 * | 1/2002 | Kalsi | F16K 3/12 251/326 |
| 6,776,184 B1 | 8/2004 | Maichel et al. | |
| 6,845,783 B1 * | 1/2005 | Sheppard | F16K 3/18 137/243 |
| 6,942,194 B2 | 9/2005 | Gravningen et al. | |
| 8,499,783 B2 | 8/2013 | Woodward | |
| 8,695,637 B2 | 4/2014 | McBride | |
| 8,813,771 B2 | 8/2014 | Rayment et al. | |
| 2004/0245488 A1 | 12/2004 | Isbitsky | |
| 2005/0194245 A1 | 9/2005 | Lah | |
| 2009/0095934 A1 | 4/2009 | Cain et al. | |
| 2011/0233442 A1 * | 9/2011 | Nygaard | F16K 3/182 251/327 |
| 2012/0256111 A1 * | 10/2012 | Hoang | F16K 3/18 251/264 |
| 2013/0001456 A1 | 1/2013 | Rayment et al. | |
| 2014/0007966 A1 | 1/2014 | McBride | |

FOREIGN PATENT DOCUMENTS

| | | | |
|---|---|---|---|
| DE | 19949513 A1 | 4/2001 | |
| DE | 202005012832 U1 | 5/2006 | |
| GB | 191006246 A * | 2/1911 | F16K 3/184 |
| GB | 191513358 A * | 8/1916 | F16K 3/184 |
| GB | 146362 A * | 6/1921 | F16K 3/18 |
| GB | 180121 A * | 5/1922 | F16K 3/184 |
| GB | 259221 A * | 3/1927 | F16K 3/18 |
| GB | 282318 A * | 12/1927 | F16K 3/16 |
| GB | 406922 A | 3/1934 | |
| GB | 417780 A * | 10/1934 | F16K 3/184 |
| GB | 462980 A * | 3/1937 | F16K 3/184 |
| GB | 903341 A * | 8/1962 | F16K 3/316 |
| GB | 1072393 A * | 6/1967 | F16K 3/16 |
| GB | 1161090 A * | 8/1969 | F16K 3/184 |
| GB | 2151755 B | 10/1986 | |
| WO | 2011105737 A2 | 9/2011 | |

OTHER PUBLICATIONS

Extended European Search Report for European application No. 16166690.4 dated Jul. 28, 2016, 8 pages.

International Preliminary Report on Patentability for International application No. PCT/US2016/028658 dated Apr. 21, 2016, 12 pages.

Communication pursuant to Article 94(3) for European application No. 16166690.4 dated Nov. 20, 2017, 7 pages.

* cited by examiner

PARALLEL SLIDE GATE VALVES AND RELATED METHODS

FIELD

Embodiments of the present disclosure relate to valves having translatable obturators, such as gate valves having parallel slide gates.

BACKGROUND

Many valve types have been employed for stopping and controlling the flow of fluids in a pipe or other flow path. Each type of valve offers certain advantages and disadvantages. Some valve types include plug valves, ball valves, stop or globe valves, angle valves, butterfly valves, and gate valves.

Wedge gate valves have a gate shaped as a wedge, with two opposed inclined planar faces (typically metal) that each seal against part of a valve seat of the body of the valve. Both of the faces of the gate and the corresponding surfaces of the valve seat are typically machined to allow the gate to form a seal. Manufacturing tolerances and deposition of material during use of the valve may cause problems forming seals, either at installation or later in the life of gate valve. O-rings may be recessed in each of the metal faces to limit leakage of such a valve, but this typically requires machining during manufacture, and thus, additional costs. Wedge gate valves typically have a recess at the base of the valve body to receive the tip of the wedge shaped gate. This recess can fill with debris, impeding full gate closure.

Parallel slide gate valves typically include a gate having two members separated by a spring or other biasing member. The gate slides into a sealing position between parallel valve seats. For example, as shown in FIG. 1, a gate valve 10 may include a valve body 12 having an internal surface 14, upstream opening 16, a downstream opening 18, and a generally horizontal internal passage 20 therebetween for accepting a flow of fluid indicated by arrow A. The internal surface 14 defines a vertically oriented internal chamber 22 that intersects the internal passage 20 approximately midway between the upstream opening 16 and the downstream opening 18. The internal chamber 22 provides room for a gate 24 to move vertically out of and into the internal passage 20 to open and close the gate valve 10. The gate 24 includes two generally planar halves 24a, 24b, connected by a carrier ring 26 and bracket 28. A spring 30 urges the halves 24a, 24b apart, pushing one or both halves 24a, 24b against valve seats 32a, 32b when the gate valve 10 is closed, blocking the internal passage 20. When the gate valve 10 is open, the spring 30 urges the halves 24a, 24b apart against the bracket 28, which limits the distance that the halves 24a, 24b may travel from one another, such that the halves 24a, 24b do not separate within the internal chamber 22. The gate valve 10 also includes a valve stem 34 configured to vertically move the gate 24 and a handle 36 or other means (e.g., a motor) to move the valve stem 34. The valve stem 34 may be threaded or unthreaded, and may or may not rotate to move the gate 24.

Failure of the bracket 28 may cause the halves 24a, 24b to become decoupled from one another, such that the gate 24 cannot be moved back into the internal passage 20 to close the gate valve 10. Furthermore, failure of the bracket 28 may cause the halves 24a, 24b, the carrier ring 26, the bracket 28, and/or the spring 30 to be flushed downstream with the fluid.

It would be beneficial to provide a valve design that alleviates some or all of these drawbacks.

BRIEF SUMMARY

In some embodiments, a parallel slide gate valve includes a valve body comprising an interior surface, and an obturator therein. A portion of the interior surface defines at least one groove having a longitudinal axis oriented substantially perpendicular to a direction of flow along a fluid flow path through the valve body. The at least one groove has a first width at a first end proximate to the fluid flow path and a second width at a second end distal from the fluid flow path, the second width smaller than the first width. The obturator is at least partially within the at least one groove. The obturator is configured to translate from the first end of the at least one groove toward the second end of the at least one groove as the obturator moves from a closed position to an open position.

A method of operating such a parallel slide gate valve may include passing a fluid through the valve body while the obturator is in an open position, translating the obturator perpendicular to the direction of flow of the fluid from the second end of the at least one groove toward the first end of the at least one groove, and forming a seal between a surface of the obturator and the valve body to terminate flow through the valve body.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any particular valve, but are merely idealized representations that are employed to describe example embodiments of the present disclosure. Additionally, elements common between figures may retain the same numerical designation.

As used herein, the term "valve" means and includes any device configured to regulate, direct, or control the flow of fluids (i.e., liquids and/or gases).

As used herein, the term "obturator" means and includes a valve closure member, such as disk, a gate, a plug, or a ball. For example, in a gate valve, the obturator is a translating gate. An obturator may include one or more members.

Disclosed herein are parallel slide gate valves configured to operate without a bracket holding two halves of a gate together. The valves may have fewer moving parts than conventional parallel slide gate valves, and may therefore be more robust and less prone to catastrophic failure.

Figure 1:
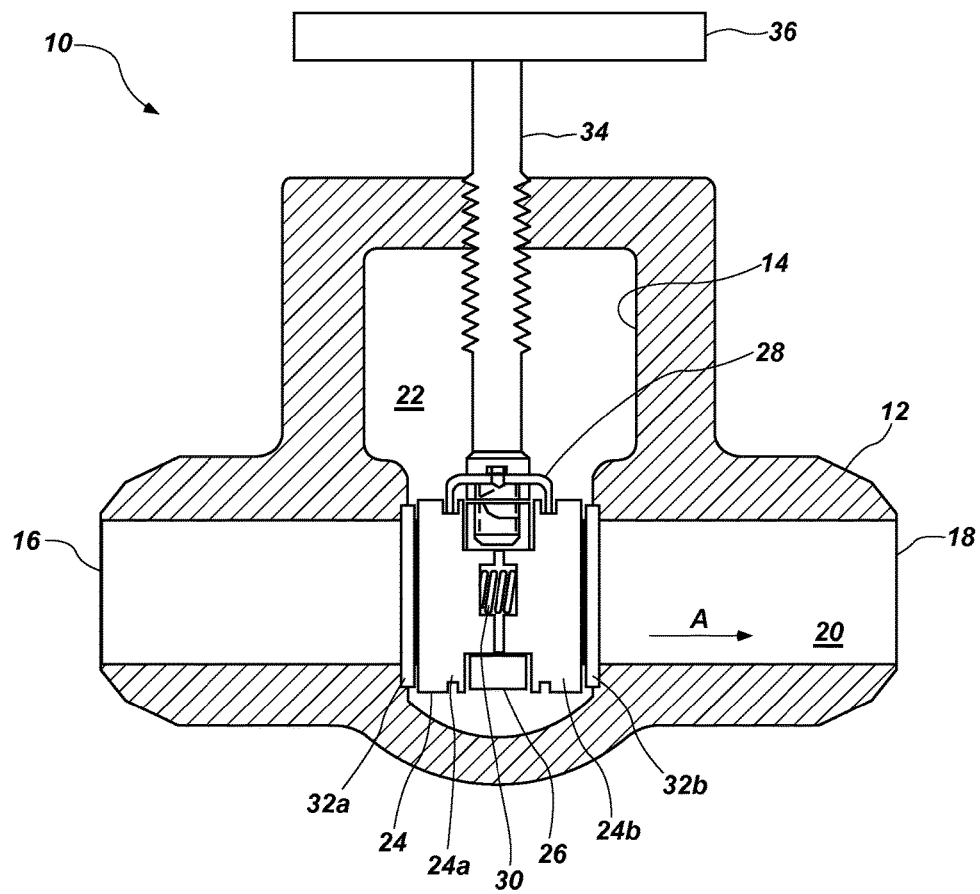
FIG. 1 is a simplified cross-sectional side view illustrating a conventional parallel slide gate valve.
Figure 2:
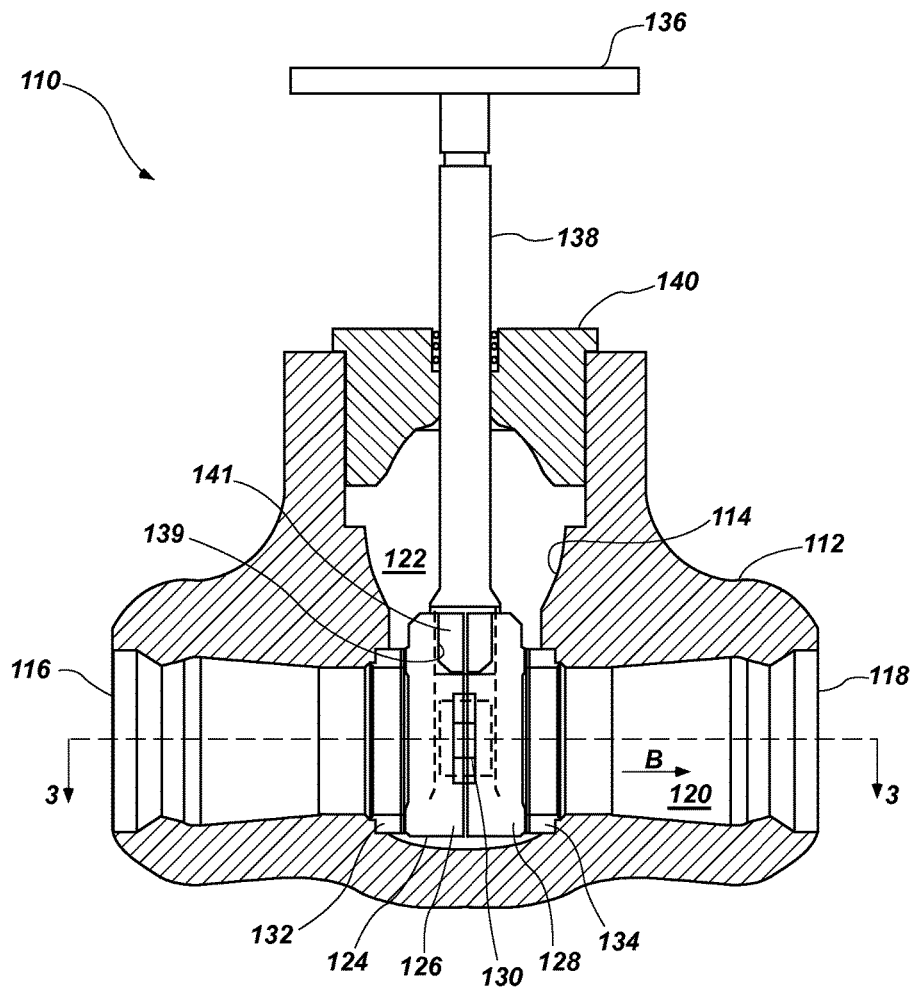
FIG. 2 is a simplified cross-sectional side view illustrating a parallel slide gate valve according to the present disclosure.

As shown in FIG. 2, a gate valve 110 may include a valve body 112 having an internal surface 114, an upstream opening 116, a downstream opening 118, and a generally horizontal internal passage 120 therebetween for accepting a flow of fluid indicated by arrow B. The internal surface 114 may define a vertically oriented internal chamber 122 that intersects the internal passage 120 approximately midway between the upstream opening 116 and the downstream opening 118. The internal chamber 122 provides room for an obturator 124 (e.g., a gate) to move vertically out of and into the internal passage 120 to open and close the gate valve 110. The obturator 124 may include two generally planar members 126, 128. A biasing member 130 (e.g., a spring) urges the members 126, 128 apart, pushing one or both members 126, 128 against valve seats 132, 134 when the gate valve 10 is closed, blocking the internal passage 120. The gate valve 110 may also include a control device 136 (e.g., a handle, a motor, an electronic actuator, etc.) configured to vertically move a valve stem 138 and the obturator 124. The valve stem 138 may be threaded or unthreaded, and may or may not rotate to move the obturator 124. A bonnet 140 may hold the valve stem 138 and the obturator 124 in place within the valve body 112, and may define a portion of the internal chamber 122.

Figure 3:
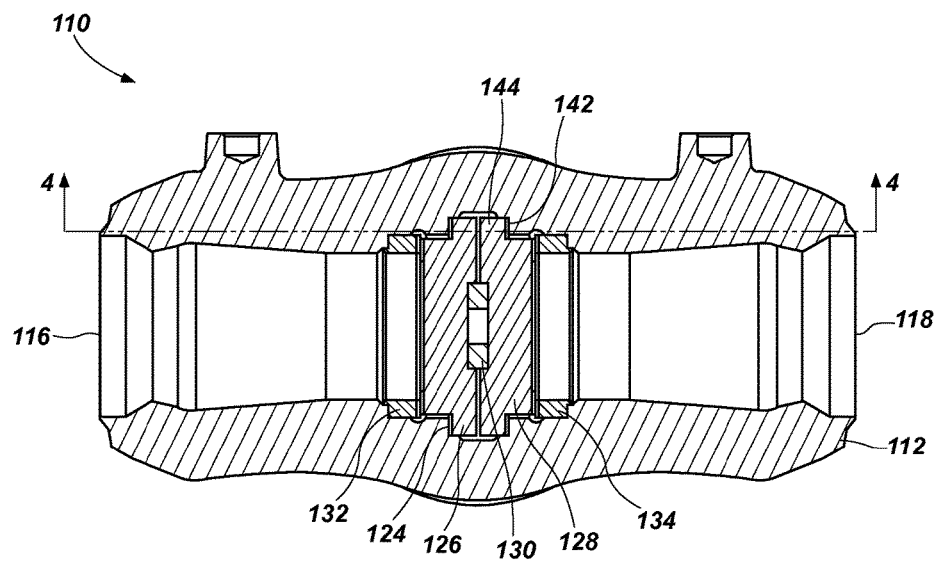
FIG. 3 is a simplified cross-sectional side view taken through the plane 3-3 shown in FIG. 2.

FIG. 3 illustrates a cross-sectional view of the gate valve 110 taken through the plane 3-3 shown in FIG. 2. As shown in FIG. 3, the internal surface 114 of the valve body 112 may define one or more grooves 142 in which the obturator 124 may be disposed. For example, FIG. 3 illustrates two grooves 142 on opposite sides of the obturator 124. The grooves 142 may retain opposing surfaces of the obturator 124 within the valve body 112. For example, the grooves 142 may retain the obturator 124 while the obturator 124 is in an open position (i.e., up, in the orientation shown in FIG. 2). In some embodiments, the obturator 124 may slide within the grooves 142 between the open position and a closed position. In other embodiments, the obturator 124 may leave the grooves 142 during a portion of its travel (e.g., when the obturator 124 is between the valve seats 132, 134).

The obturator 124 is configured to be movable out of and into the internal passage 120 to open and close the gate valve 110. When the obturator 124 is in the closed position, the obturator 124 may rest against one or both of the valve seats 132, 134, preventing fluid flow through the internal passage 120. If the internal passage 120 contains pressurized fluid (e.g., in the upstream portion of the internal passage 120), the fluid may push one of the members 126, 128 toward the other, such that a seal is formed between the obturator 124 and only one of the valve seats 132, 134 (e.g., between the downstream member 128 and the downstream seat 134). If the internal passage 120 does not contain pressurized fluid, or if the force of the fluid pressure on the obturator 124 is less than the force of biasing member 130 on the members 126, 128, the biasing member 130 may push both members 126, 128 outward, forming seals against each of the valve seats 132, 134.

The obturator 124 may include one or more guide rails 144 disposed within the grooves 142 of the valve body 112. The guide rails 144 may be configured to move within the grooves 142, such as by sliding vertically upward and downward in the orientation of FIG. 2. The guide rails 144 may include portions of each of the members 126, 128 of the obturator 124. For example, each member 126, 128 may include two guide rails 144.

As shown in FIGS. 2 and 3, the members 126, 128 of the obturator 124 may be substantially parallel to one another, separated by an approximately uniform distance. The biasing member 130 may maintain the members 126, 128 in position. The grooves 142 may provide an opposing force to the force of the biasing member 130, such that the members 126, 128 are maintained in position without the need for any bracket coupled to, part of, or moving along with the obturator 124. That is, other than the guide rails 144 and the valve seats 132, 134, there need not be any other part of the gate valve 110 to hold the members 126, 128 together. In some embodiments, the obturator 124 may consist essentially of the members 126, 128 and the biasing member 130, without any other parts. Thus, the gate valve 110 may require fewer parts than conventional parallel slide gate valves, and may be cheaper to manufacture and less prone to failure.

The obturator 124 may include means for coupling to the valve stem 138, such as by a void 139 defined by the members 126, 128 such that an end 141 of the valve stem 138 may move within the void 139. Each of the members 126, 128 may fit around the end 141 of the valve stem 138, such that the valve stem 138 is be coupled to the obturator 124 unless the members 126, 128 are laterally separated from one another (such as when the gate valve 110 is disassembled).

In some embodiments, the obturator 124 may be configured to leave the grooves 142 as the valve stem 138 moves the obturator 124 from the open position to the closed position. In such embodiments, the grooves 142 may not extend laterally adjacent to the internal passage 120. The grooves 142 may include an entrance portion having a width sufficient to guide the obturator 124 into the grooves 142 as the obturator 124 moves to the open position.

When the gate valve 110 is open, the biasing member 130 may urge the members 126, 128 apart against the grooves 142. The grooves 142 may limit the distance that the members 126, 128 may travel from one another, such that the members 126, 128 do not separate within the internal chamber 122.

Figure 4:
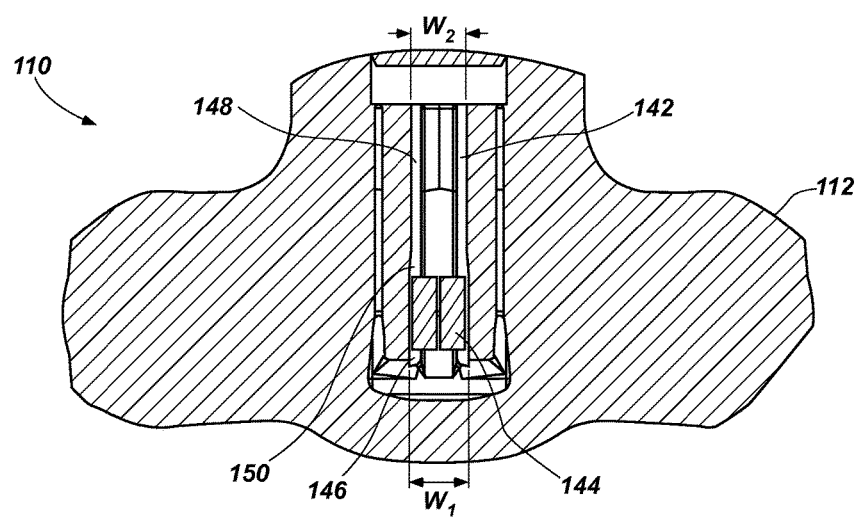
FIG. 4 is a simplified cross-sectional side view taken through the plane 4-4 shown in FIG. 3.

FIG. 4 illustrates a cross-sectional view of the gate valve 110 taken through the plane 4-4 shown in FIG. 3. As shown in FIG. 4, the walls of the grooves 142 may be oriented substantially perpendicular to the direction of flow B through the gate valve 110. The grooves 142 may include portions having different widths. For example, the grooves 142 may have a first end 146 proximate to the path of fluid flow through the gate valve 110 and a second end 148 distal from the path of fluid flow. The first end 146 may have a first width $w_1$, and the second end 148 may have a second width $w_2$. The second width $w_2$ may be smaller than the first width $w_1$. A transition region 150 may connect the first end 146 to the second end 148, providing a smooth path along which the guide rails 144 may slide when opening or closing the gate valve 110.

The transition region 150 may guide the members 126, 128 of the obturator 124 toward one another as the obturator 124 moves from the closed position to the open position. The members 126, 128 may move away from one another as the obturator 124 moves to the closed position. Thus, when the obturator 124 is in the closed position, the biasing member 130 may press at least one of the members 126, 128 against the valve seats 132, 134 without interference from the grooves 142. The grooves 142 may keep the obturator 124 in place within the valve body 112 as the gate valve 110 is opened and closed (a function conventionally performed by a bracket that moves along with the members 126, 128 of the obturator 124), such that no bracket may be necessary.

The valve seats 132, 134 may be configured as rings encircling the internal passage 120 of the gate valve 110. The valve seats 132, 134 may, in some embodiments, be welded, pressed, or otherwise affixed to the valve body 112. In some embodiments, the valve seats 132, 134 may be integral to the valve body 112. In other embodiments, the valve seats 132, 134 may be separately formed and placed into the valve body 112, such as in a volume that has been machined out of the valve body 112. At least one surface of at least one of the valve seats 132, 134 may be configured to abut against the obturator 124 when the obturator 124 is in the closed position. If the valve seats 132, 134 are separate members from the valve body 112, at least one surface of each valve seat 132, 134 may be configured to seal against the valve body 112.

The valve seats 132, 134 may be configured to abut against the members 126, 128 of the obturator 124 to form a seal between the obturator 124 and the valve body 112. The valve seats 132, 134 may be adjacent a surface of the valve body 112 having approximately the same shape as surfaces of the obturator 124. For example, surfaces of the valve body 112 adjacent the valve seats 132, 134 may include a planar shape and/or a cylindrical shape. The valve seats 132, 134 may be stationary with respect to the valve body 112, such that as the obturator 124 is urged lower into the valve body 112, the obturator 124 presses against one or both of the valve seats 132, 134 to form a fluid-tight seal. In some embodiments, the valve seats 132, 134 may be a single unitary body, such as a sleeve having holes matching the internal passage 120. The valve seats 132, 134 may be configured such that the obturator 124 may freely (i.e., without mechanical interference) translate between the open position and the closed position. In some embodiments, the valve seats 132, 134 may be omitted altogether, and the obturator 124 may form a seal directly against the valve body 112 when the obturator 124 is in the closed position.

The valve seats 132, 134, if present, may be formed of any selected material. The valve seats 132, 134 may be formed of a single material or of multiple materials. For example, the valve seats 132, 134 may include hard materials (e.g., carbon graphite), metals, alloys, etc. The valve seats 132, 134 may include a hardfacing material formulated to be more resistant to wear and damage than the valve body 112 and/or the obturator 124. For example, the valve seats 132, 134 may include a cobalt-chromium alloy, such as those available from Kennametal Stellite, of Goshen, Ind., under the name STELLITE®. One particular class of materials is known as STELLITE® 6, and contains about 28% Cr, about 1.2% C, about 1% Mn, about 1.1% Si, about 4.5% W, up to about 3% Ni, and up to about 3% Fe, with the balance Co (all percentages based on weight).

The valve body 112 and/or the obturator 124 may be formed of any appropriate materials, which may be selected based on factors such as durability, costs, the compositions of fluids to be transferred through the gate valve 110, and operating conditions such as temperature and pressure. In some embodiments, the valve body 112 and/or the obturator 124 may be formed of carbon-steel, low-carbon steel, or another iron-based alloy. In some embodiments, the valve body 112 and/or the obturator 124 may include a chromium-molybdenum alloy, such as ASTM A217-CW9, which contains from about 2.00% to about 2.75% Cr, from about 0.90% to about 1.20% Mo, from about 0.05% to about 0.18% C, from about 0.40% to about 0.70% Mn, up to about 0.04% P, up to about 0.045% S, up to about 0.60% Si, and up to about 0.50% Ni (all percentages based on weight). In other embodiments, the valve body 112 and/or the obturator 124 may include ASTM A216-WCB, which contains a total of 1.00% or less of the following elements: up to about 0.30% C, up to about 1.00% Mn, up to about 0.60% Si, up to about 0.035% P, up to about 0.35% S, up to about 0.50% Ni, up to about 0.20% Mo, up to about 0.30% Cu, and up to about 0.03% V (all percentages based on weight).

The gate valve 110 may be operated by passing a fluid through the valve body 112 while the obturator 124 is in an open position (i.e., up, in the orientation of FIG. 2). The gate valve 110 may be closed by translating the obturator 124 perpendicular to the direction of flow of the fluid from the second end 148 of the one or more grooves 142 toward the first end 146 of the one or more grooves 142. Moving the obturator 124 downward (in the orientation of FIG. 2) may form a seal between a surface of the obturator 124 and the valve body 112 to terminate flow through the gate valve 110. Flow may be restarted by translating the obturator 124 in the opposite direction, from the second end 148 to the first end 146 of the grooves 142, breaking the seal between the obturator 124 and the valve body 112.

Translating the obturator 124 from the first end 146 to the second end 148 of the grooves 142 (i.e., opening the gate valve 110) may cause the thickness of the obturator 124 to decrease as the grooves 142 push the members 126, 128 together. That is, the distance between the members 126, 128 may decrease as the obturator 124 travels from the first end 146 to the second end 148. Conversely, translating the obturator 124 from the second end 148 to the first end 146 of the grooves 142 (i.e., closing the gate valve 110) may cause the thickness of the obturator 124 to increase as the biasing member 130 pushes the members 126, 128 outward.

The gate valve 110 may carry any selected fluid, such as liquid water, steam, a hydrocarbon, a slurry, wastewater, etc. The dimensions, materials, and operation of the gate valve 110 may vary depending on the characteristics of the material expected to flow through the gate valve 110. For example, some gate valves 110 may be configured to be operated manually, such as by a handle or wheel, and others may be configured to be operated by an actuator or motor.

The size of the gate valve 110 may be selected based on operational requirements. For example, the internal chamber 122 may have an average diameter or other characteristic dimension from about ⅛ inch (about 3.2 mm) to about 12 inches (about 30.5 cm) or more. For example, the internal chamber 122 may have an average diameter from about ½ inch (about 12.7 mm) to about 3 inches (about 76 mm).

The control device 136 may be used to vertically translate the valve stem 138 and the obturator 124 between the open position and the closed position. For example, the control device 114 may include a handle or an actuator, and may be configured to be operated by a human operator, by an electrical current, compressed air, etc. If the control device 114 includes a handle, the handle may include a wheel, a tee, a lever, or any other means to apply a force to the valve stem 138. In some embodiments, the control device 114 may be controlled by a computer.

The vertical position of the obturator 124 may be adjusted during use of the gate valve 110. That is, the obturator 124 may be adjusted upward or downward to improve the seal against the valve seats 132, 134. Because the members 126, 128 of the obturator 124 are generally planar and parallel, the obturator 124 may form a fluid seal across a relatively wide range of vertical positions.

Compared to prior art designs of parallel-slide and wedge gate valves, the geometry of the proposed designs may provide lateral support of the members 126, 128 when the obturator 124 is in the open position, without the need for a bracket. Because failure of a bracket can render a valve inoperable or send parts downstream with the fluid, the designs disclosed herein may be less prone to failure. Thus, costs of removing and repairing damaged valves and other equipment (including process downtime) may be reduced.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various valve types and configurations.

What is claimed is:

1. A parallel slide gate valve, comprising:
  a valve stem coupled to an obturator and configured to translate the obturator relative to a valve body between an open position and a closed position;
  the valve body comprising an interior surface, wherein a portion of the interior surface defines at least one recessed groove within the surface, the recessed groove being substantially rectangular and having a length and at least one width with the length oriented parallel to the valve stem and substantially perpendicular to a direction of flow along a fluid flow path through the valve body, wherein the at least one recessed groove has a first width at a first end proximate to the fluid flow path and a second width at a second end distal from the fluid flow path, the second width smaller than the first width; and
    the obturator comprising a first generally planar member, a second generally planar member, and a biasing member between the first generally planar member and the second generally planar member, wherein the first generally planar member is oriented substantially parallel to the second generally planar member, wherein the obturator comprises at least one guide rail comprising a portion of each of the first generally planar member and the second generally planar member, the at least one guide rail protruding into the at least one recessed groove in the valve body, and configured to move within the at least one recessed groove when the obturator translates from the closed position to the open position; and
  wherein the obturator is configured to translate from the first end of the at least one groove toward the second end of the at least one groove as the obturator moves from the closed position to the open position, wherein the obturator positively seals the valve against the valve body in the closed position by action of the biasing member of fluid pressure.

2. The parallel slide gate valve of claim 1, wherein the first generally planar member and the second generally planar member of the obturator are maintained within a selected distance from one another by the at least one recessed groove.

3. The parallel slide gate valve of claim 1, wherein the at least one recessed groove is configured to cause a distance between the first generally planar member and the second generally planar member to decrease as the obturator moves from the closed position to the open position.

4. The parallel slide gate valve of claim 1, wherein the first generally planar member and the second generally planar member of the obturator are maintained within a selected distance from one another without a bracket coupled to the obturator.

5. The parallel slide gate valve of claim 1, further comprising at least one valve seat having a sealing surface configured to abut against a surface of the obturator and form a fluid seal between the obturator and the valve body when the obturator is in the closed position.

6. The parallel slide gate valve of claim 5, wherein at least one valve seat is welded to the valve body.

7. The parallel slide gate valve of claim 5, wherein the at least one valve seat comprises a hardfacing material.

8. The parallel slide gate valve of claim 1, further comprising a handle coupled to the valve stem.

9. The parallel slide gate valve of claim 1, wherein at least one recessed groove comprises two grooves configured to retain opposing surfaces of the obturator when the obturator is in the open position.

10. The parallel slide gate valve of claim 1, wherein the obturator is configured to leave the at least one recessed groove as the valve stem moves the obturator from the open position to the closed position.

11. A method of operating a parallel slide gate valve comprising a valve body and an obturator coupled to a valve stem within the valve body, the method comprising:
  passing a fluid through the valve body while the obturator is in an open position, wherein the valve body comprises an interior surface, a portion of the interior surface defining at least one recessed groove within the surface, the recessed groove being substantially rectangular and having a length and at least one width with the length oriented parallel to the valve stem and substantially perpendicular to a direction of flow along a fluid flow path through the valve body, wherein the at least one recessed groove has a first width at a first end proximate to the fluid flow path and a second width at a second end distal from the fluid flow path, the second width smaller than the first width;
  translating the obturator perpendicular to the direction of flow of the fluid from the second end of the at least one groove toward the first end of the at least one groove, wherein the obturator comprises a first generally planar member, a second generally planar member, and a biasing member between the first generally planar member and the second generally planar member, wherein the first generally planar member is oriented substantially parallel to the second generally planar member, and wherein the obturator further comprises at least one guide rail comprising a portion of each of the first generally planar member and the second generally planar member, protruding into the at least one recessed groove in the valve body, and configured to move within the at least one recessed groove when the obturator translates from a closed position to an open position; and
  forming a seal between a surface of the obturator and the valve body by action of the biasing member or fluid pressure to terminate flow through the valve body.

12. The method of claim 11, wherein translating the obturator perpendicular to the direction of flow of the fluid from the second end of the at least one recessed groove toward the first end of the at least one groove comprises increasing a thickness of the obturator.

13. The method of claim 11, further comprising translating the obturator perpendicular to the direction of flow of the fluid from the first end of the at least one recessed groove toward the second end of the at least one groove to restart fluid flow through the valve body.

14. The method of claim 13, wherein translating the obturator perpendicular to the direction of flow of the fluid from the first end of the at least one recessed groove toward the second end of the at least one groove comprises decreasing a thickness of the obturator.

15. The method of claim 13, further comprising breaking the seal between the surface of the obturator and the valve body.

* * * * *